Feb. 26, 1929.

H. J. MORLANG ET AL 1,703,160

TUBING SUPPORT

Filed April 15, 1924

INVENTORS.
Harry J. Morlang
and John J. Russell
by W. C. Doolittle
their attorney Patented Feb. 26, 1929.

1,703,160

UNITED STATES PATENT OFFICE.

HARRY J. MORLANG, OF FORT WORTH, AND JOHN J. RUSSELL, OF RANGER, TEXAS, ASSIGNORS TO OIL WELL SUPPLY COMPANY, OF PITTSBURGH, PENNSYLVANIA, A CORPORATION OF PENNSYLVANIA.

TUBING SUPPORT.

Application filed April 15, 1924. Serial No. 706,714.

This invention is for a tubing support for wells, particularly oil wells.

In oil wells which are to be pumped, tubing is let into the well within the casing. It is through this tubing that the oil is pumped, and it is desirable that the tubing be suspended from its upper end so that its lower end will be free of the bottom of the hole. This is generally effected by providing, at the top of the casing, a casing-head having a gas outlet connection and having a cap member from which the tubing is suspended.

The present invention has for its principal objects to provide a tubing support of improved construction, applicable to a casing head and having a packing for closing the support against the escape of gas, which packing may be set after the tubing has been adjusted in place.

The invention may be readily understood by reference to the accompanying drawings, in which.

Figure 1:
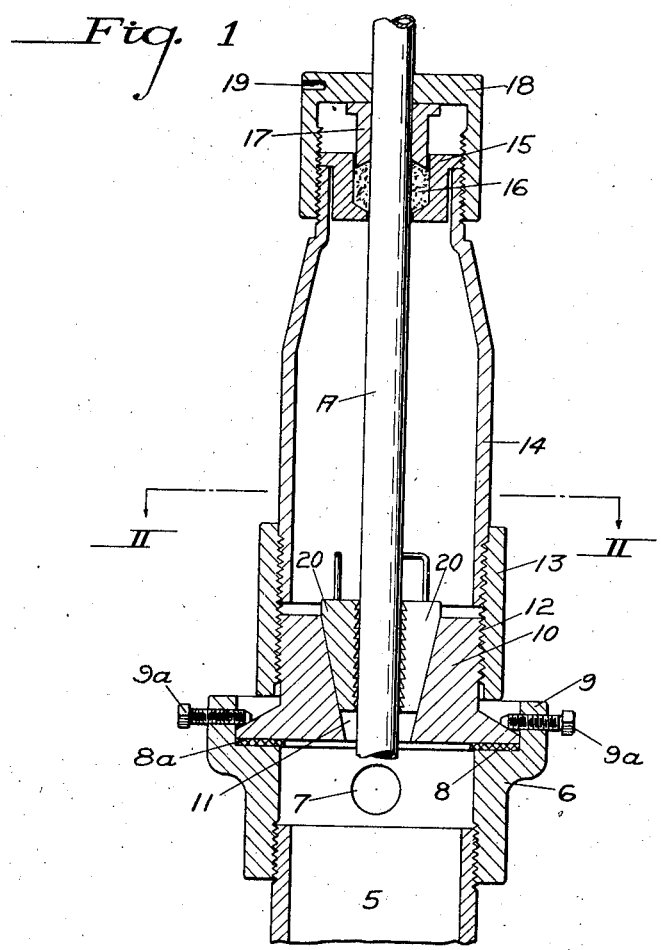
Fig. 1 is a vertical section through a support embodying our invention.
Figure 2:
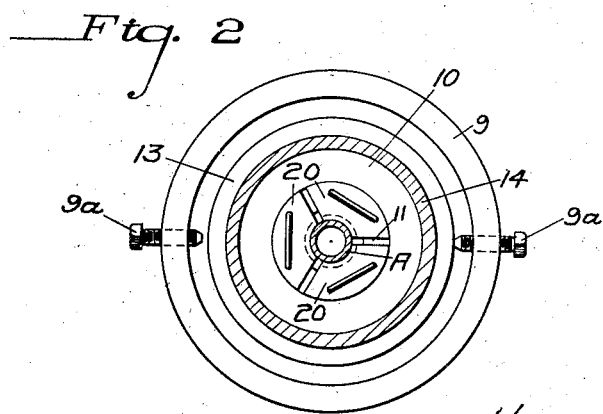
Fig. 2 is a transverse section in the plane of line II—II of Fig. 1.

In the drawings, 5 designates the top of a casing, and 6 is a casing-head having one or more openings 7 therein, through which gas may escape into pipes, not shown, in accordance with the usual practice. The casing-head has an open top surrounded by a seat 8 and a flange 9. On the seat 8 is a packing gasket 8ª.

The tubing support, which comprises my invention, consists of a cap or base part 10 having a conical central opening 11 therein through which the well tubing A may pass. The cap 10 may have an annular flange which centers the support inside the flange 9 on the casing-head. Bolts 9ª on the casing-head may be utilized to retain the cap 10 in position.

The top portion of the cap is exteriorly threaded at 12 to engage and receive an interiorly threaded coupling 13. Screwed into this coupling is a hood or bonnet 14 which supports a stuffing box 15, in which is packing 16. The packing is confined by a gland 17 that may be adjusted through cap nut 18 threaded onto the top of the bonnet. A hole 19 for receiving the pin on a wrench is shown in the drawing.

In the opening 8 are slips 20, three being shown, for holding the tubing A in suspension from the cap.

In use, the tubing A is adjusted to position, after which slips 20 are put in place. This is done with the bonnet disconnected from the base or packing. Then the bonnet is secured in place, the coupling, of course, enabling the bonnet to be detached or screwed back into place.

When the bonnet is in place, the gland 17 may be operated to set the packing 16, thus preventing the leakage of gas from around the tubing.

The weight of the suspended string of tubing holds cap or base 10 in sealing relation with gasket 8ª.

The entire construction may be easily and cheaply made, and presents a material advantage in enabling the slips to be set before the packing is taken up.

We claim as our invention:

1. A tubing support and closure comprising a cap having an opening therethrough, tubing engaging slips in the opening for directly engaging the tubing, an enclosing means carried by the cap and having a central tube receiving opening therein and a stuffing box structure around the second opening, and threaded means comprising a coupling for detachably securing the enclosing means to the cap, said stuffing box structure being threaded to the upper end of the enclosing means.

2. A tubing support and closure comprising a cap having a central opening therethrough, removable tubing engaging slips in the opening, a coupling screwed to the upper end of the cap, a bonnet screwed to the coupling and having a threaded upper end, a stuffing box threaded on the upper end of the bonnet, packing in the box, a gland for cooperation with the box, and a cap nut threaded onto the upper end of the bonnet and enclosing the gland and stuffing box, said cap nut providing means for adjusting the gland.

In testimony whereof we affix our signatures.

H. J. MORLANG.
JOHN J. RUSSELL.